United States Patent
Li et al.

(10) Patent No.: US 9,143,862 B2
(45) Date of Patent: Sep. 22, 2015

(54) CORRELATION BASED FILTER ADAPTATION

(71) Applicant: Microsoft Corporation, Redmond, WA (US)

(72) Inventors: Qin Li, Houston, TX (US); Vinod Prakash, Redmond, WA (US)

(*) Notice: Subject to any disclaimer, the term of this patent is extended or adjusted under 35 U.S.C. 154(b) by 305 days.

(21) Appl. No.: 13/716,227

(22) Filed: Dec. 17, 2012

(65) Prior Publication Data

US 2014/0169568 A1    Jun. 19, 2014

(51) Int. Cl.
    *H04R 5/00*    (2006.01)
    *H04R 5/04*    (2006.01)
    *H04M 9/08*    (2006.01)

(52) U.S. Cl.
    CPC *H04R 5/04* (2013.01); *H04M 9/082* (2013.01)

(58) Field of Classification Search
    CPC ............. H04R 5/02; H04R 5/00; H04R 5/04; H04M 9/082
    USPC ............. 381/1, 11, 93, 17, 18, 310, 111, 121, 381/92, 77, 66, 71.11, 94.3, 58; 700/94; 704/226, 201, E21.002; 708/322; 379/406.01, 406.08, 406.03, 32.01, 379/388.02, 392.01, 406.05, 379, 412
    See application file for complete search history.

(56) References Cited

U.S. PATENT DOCUMENTS

| | | | |
|---|---|---|---|
| 6,738,480 B1 * | 5/2004 | Berthault et al. | 381/66 |
| 6,885,750 B2 * | 4/2005 | Egelmeers et al. | 381/66 |
| 7,003,099 B1 | 2/2006 | Zhang et al. | |
| 7,058,185 B1 | 6/2006 | Egelmeers et al. | |
| 2003/0185402 A1 | 10/2003 | Benesty et al. | |
| 2005/0213747 A1 | 9/2005 | Popovich et al. | |
| 2006/0002547 A1 * | 1/2006 | Stokes et al. | 379/406.14 |

(Continued)

FOREIGN PATENT DOCUMENTS

JP    2012205123 A    10/2012

OTHER PUBLICATIONS

Shimauchi, et al., "A Stereo Echo Canceller Implemented Using a Stereo Shaker and a Duo-Filter Control System", Retrieved at <<http://ieeexplore.ieee.org/stamp.jsp?tp=&amumber=759806>>, Proceedings of the IEEE International Conference on Acoustics, Speech, and Signal Processing, Mar. 15, 1999, pp. 4.

(Continued)

*Primary Examiner* — Vivian Chin
*Assistant Examiner* — Ubachukwu Odunukwe
(74) *Attorney, Agent, or Firm* — Andrew Smith; Micky Minhas

(57) ABSTRACT

Example apparatus and methods concern performing stereo acoustic echo cancellation using a correlation based filter adaptation control approach and without using stereo de-correlation. An embodiment includes a stereo adaptive filter that produces an echo removed microphone signal from received audio signals. The embodiment includes a mono adaptive filter that produces an echo removed microphone signal from the received audio signals. A correlation detector determines a level of correlation between the received signals and provides a signal to an adaptive filter controller. The adaptive filter controller controls how the stereo adaptive filter and the mono adaptive filter adapt audio echo cancellation as a function of the correlation between the received signals. A signal selector may select for output the signal from either the stereo adaptive filter or the mono adaptive filter based, for example, on the power level of the signals.

16 Claims, 8 Drawing Sheets

(56) References Cited

U.S. PATENT DOCUMENTS

2009/0252337 A1* 10/2009 Chen et al. .................. 381/1
2012/0170755 A1    7/2012 Jonsson et al.

OTHER PUBLICATIONS

Yukawa, et al., "Stereo Echo Canceler by Adaptive Projected Subgradient Method with Multiple Room-Acoustics Information", Retrieved at <<http://iwaenc05.ele.tue.nl/proceedings/papers/S03-15.pdf>>, Proceedings of the International Workshop on Acoustic Echo and Noise Control, Sep. 12, 2005, pp. 4.

Sankaran, et al., "Stereophonic Acoustic Echo Cancellation Using NLMS with Orthogonal Correction Factors", Retrieved at <<http://www.dsprl.ece.vt.edu/pubs/conf/IEEE_IWAENC/1999_40_sgsaab.pdf>>, Proceedings of the International Workshop on Acoustic Echo and Noise Control, Sep. 1999, pp. 4.

Makino, Shoji., "Stereophonic Acoustic Echo Cancellation: An Overview and Recent Solutions", Retrieved at <<http://www.tara.tsukuba.ac.jp/~maki/reprint/Makino/sm01asjr325-333.pdf>>, Retrieved Date: Oct. 3, 2012, pp. 9.

Slock, et al., "Numerically Stable Fast Transversal Filters for Recursive Least Squares Adaptive Filtering", Retrieved at http://ieeexplore.ieee.org/stamp/stamp.jsp?tp=&amumber=80769>>, Proceedings of the IEEE Trans. Signal Processing, vol. 39, No. 1, Jan. 1999, pp. 23.

Benesty, et al., "Adaptive filtering algorithms for stereophonic acoustic echo cancellation", Retrieved at <<http://ieeexplore.ieee.org/stamp/stamp.jsp?tp=&amumber=479501>>, Proceedings of the International Conference on Acoustics, Speech, and Signal Processing, May 9, 1995, pp. 4.

Benesty, et al., "A Better Understanding and an Improved Solution to the Problems of Stereophonic Acoustic Echo Cancellation", Retrieved at <<http://ieeeplore.ieee.org/stamp/stamp.jsp?tp=&amumber=599629>>, Proceedings of the International Conference on Acoustics, Speech, and Signal Processing, Apr. 21, 1997, pp. 4.

Eneroth, et al., "Studies of a wideband stereophonic acoustic echo canceler", Retrieved at <<http://ieeexplore.ieee.org/stamp/stamp.jsp?tp=&amumber=810886>>, Proceedings of the IEEE Workshop on Applications of Signal Processing to Audio and Acoustics, Oct. 17, 1999, pp. 4.

Hitty, Birger., "Recursive Least Squares Algorithms using Multirate Systems for Cancellation of Acoustical Echoes", Retrieved at <<http://ieeexplore.ieee.org/stamp/stamp.jsp?tp=&amumber=116159>>, Proceedings of the International Conference on Acoustics, Speech, and Signal Processing, Apr. 3, 1990, pp. 4.

Gay, Steven L., "Dynamically regularized fast RLS with application to echo cancellation", Retrieved at <<http://ieeexplore.ieee.org/stamp/stamp.jsp?tp=&amumber=543281>>, Proceedings of the IEEE International Conference on Acoustics, Speech, and Signal Processing, May 7, 1996, pp. 4.

Malvar, Henrique., "A Modulated Complex Lapped Transform and Its Applications to Audio Processing", Retrieved at http://ieeexplore.ieee.org/stamp/stamp.jsp?tp=&amumber=756248>>, Proceedings of the IEEE International Conference on Acoustics, Speech, and Signal Processing, Mar. 15, 1999, pp. 4.

Stokes, et al., "Acoustic Echo Cancellation with Arbitrary Playback Sampling Rate", Retrieved at <<http://ieeexplore.ieee.org/stamp/stamp.jsp?tp=&amumber=1326786>>, Proceedings of the IEEE International Conference on Acoustics, Speech, and Signal Processing, 2004, May 17, 2004, pp. 4.

Vause, et al., "Speech Intelligibility in Adverse Conditions in Recorded Virtual Auditory Environments", Retrieved at <<http://research.microsoft.com/apps/pubs?id=79809>>, Proceedings of the ICAD'98, May 17, 2004, pp. 13.

Zhang, et al., "Multichannel acoustic echo cancelation in multiparty spatial Audio conferencing with constrained kalman filtering", Retrieved at <<http://research.microsoft.com/pubs/79809/IWAENC_MChanAEC_final.pdf>>, Proceedings of the 11th International Workshop on Acoustic Echo and Noise Control, Sep. 14, 2008, pp. 4.

Stokes, et al., "Robust RLS with round robin regularization including Application to stereo acoustic echo cancellation", Retrieved at http://research.microsoft.com/pubs/69349/roundrobin.pdf>>, Proceedings of the IEEE International Conference on Acoustics, Speech and Signal Processing, May 14, 2006, pp. 4.

Acero, Alex., "Natural User Interface with Speech", Retrieved at <<http://research.microsoft.com/en-us/um/redmond/events/fs2010/presentations/acero_natural_language_interaction_today.pdf>>, Retrieved Date: May 14, 2006, pp. 46.

"International Search Report & Written Opinion for PCT Patent Application No. PCT/US2013/075708", Mailed Date: Mar. 11, 2014, Filed Date: Dec. 17, 2013, 9 Pages.

* cited by examiner

CORRELATION BASED FILTER ADAPTATION

BACKGROUND

Humans rely on spatial information to distinguish sounds and to focus on desirable sound context. Binaural listening may improve intelligibility. Thus, stereo audio may provide better voice intelligibility and speaker separation when multiple people are speaking simultaneously in the same space. This superior intelligibility and separation may enhance a user's experience during a conference call involving multiple speakers on the other end of the call. Stereo audio quality may depend on stereo acoustic echo cancellation (AEC). AEC removes the echo captured by a microphone when a sound is simultaneously played through speakers located where the microphone can hear the sound. Conventionally, stereo AEC may have depended on multi-channel adaptive filtering. However, multi-channel adaptive filtering may have variable and even undesirable performance depending on the level of correlation between stereo signals. For example, when two microphones at a far end are too close together, the signal may be highly correlated, or even identical. When the signal is too highly correlated, conventional multi-channel adaptive filtering may converge at an unacceptably slow rate, if the adaptive filtering even converges at all. This may be referred to as the non-uniqueness issue.

Conventional systems have typically addressed the non-uniqueness issue using stereo de-correlation. Stereo de-correlation may include artificially perturbing or distorting originally input signals to reduce the correlation between channels. However, distorting the input signals may affect voice quality. Additionally, distorting the input signals may alter the stereo spatial image. Further complicating the stereo de-correlation approach to the non-uniqueness issue, if a loopback signal is employed, the loopback signal may contain mono signals rendered by other applications. The presence of these mono signals may frustrate stereo de-correlation.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example systems, apparatus, and methods perform stereo acoustic echo cancellation (AEC). One example system includes a stereo adaptive filter that receives microphone capture and stereo speaker signals and produces an echo removed microphone signal from the received signals. The stereo adaptive filter participates in stereo AEC. The example system also includes a mono adaptive filter that receives microphone capture and mono speaker signals and produces an echo removed microphone signal from the received signals. The mono adaptive filter also participates in stereo AEC. A correlation logic also receives the speaker signals and determines a level of correlation between the signals. An adaptation control logic selectively alters how the stereo adaptive filter adapts and how the mono adaptive filter adapts based, at least in part, on the level of correlation between the signals.

Example systems, apparatus, and methods receive microphone and speaker signals associated with a conferencing session. The unfiltered microphone and speaker signals would produce a first level of audio echo. A degree of correlation between the input signals is determined and then used to control adaptation of stereo AEC processing by stereo adaptive filters and mono adaptive filters. The outputs from the stereo adaptive filters and the mono adaptive filters are compared and a signal having a lower power is selected and then provided as an output signal. The output signal has improved levels of audio echo (e.g., is echo free, has reduced audio echo) as compared to the input signals.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
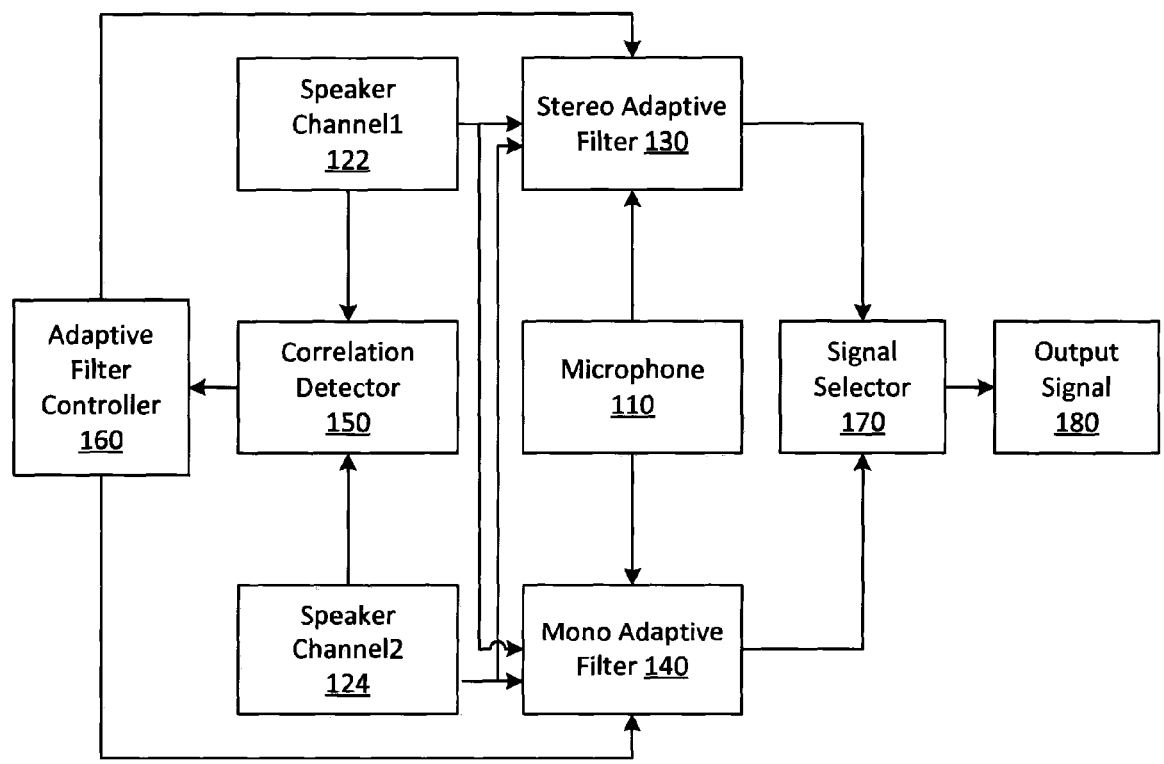
FIG. 1 illustrates an example system for performing stereo AEC using correlation based filter adaptation control.

Example systems, apparatus, and methods rely on a correlation detector that controls how a stereo adaptive filter and a mono adaptive filter that participate in stereo AEC operate. Example systems, apparatus, and methods perform stereo AEC and resolve the non-uniqueness issue without resort to stereo de-correlation. Rather than using stereo de-correlation, example, systems, apparatus, and methods detect the degree of correlation between input signals and then selectively control whether the stereo adaptive filter will continue to adapt and control whether the mono adaptive filter will continue to adapt based on the degree of correlation. In one embodiment, the stereo adaptive filter and the mono adaptive filter operate in parallel to produce echo removed signals. Since two different signals are available, the first being the output of stereo AEC and the second being the output of the mono AEC, in one embodiment, a signal selector may select and provide one of the two signals based on a comparison of the signals. For example, the signal with the lower power may be provided. The output signal will have superior audio echo properties compared to the input signal. For example, the selected output signal may be echo free or have reduced echo. In another example, the signal selector may selectively mix the two signals, with the mixture rate being determined, for example, by a comparison of the signals.

In different examples, the stereo adaptive filter and the mono adaptive filter may run in parallel, may run substantially in parallel, or may co-operate in other ways. The operation of the adaptive filters may be changed based on the degree of correlation between the input channels of the speaker signal. For example, if the channel signals are highly correlated (e.g., with a normalized cross correlation coefficient of 0.98) to the point where the correlation would negatively impact the stereo adaptive filter quality or convergence speed, then the stereo adaptive filter may be controlled to stop adapting. The stereo adaptive filter will still continue to filter and generate an output signal. Additionally, if the channel signals are barely correlated (e.g., normalized cross correlation coefficient of 0.1) to the point where the correlation would negatively impact the mono adaptive filter quality or convergence speed, then the mono adaptive filter may be controlled to stop adapting. The mono adaptive filter will still continue to filter. When the channels are correlated neither above a level that will negatively impact the stereo adaptive filter nor below a level that will negatively impact the mono adaptive filter, then both filters may continue to adapt and filter. In one embodiment, the rate at which the filters are allowed to adapt may be a function of the degree of correlation. For example, a correlation that is high, but not so high that it crosses the high threshold, may cause the stereo adaptive filter to adapt more slowly while causing the mono adaptive filter to adapt more quickly. In another example, a correlation that is low, but not so low that it crosses the low threshold, may cause the mono adaptive filter to adapt more slowly while causing the stereo adaptive filter to adapt more quickly.

In one embodiment, high fidelity audio is retained because the input signal (e.g., speaker render signal) is not modified, perturbed, or otherwise disturbed. In one embodiment, a loopback signal for system-wide echo cancellation may be employed. This facilitates cancelling system sounds.

In one embodiment, input signals may be binned into different frequency sub-bands using, for example, filter-back analysis. The signals in the different bins represented by the different sub-band domains may be processed separately and then recombined with the outputs from other bins. In this embodiment, there may be a stereo adaptive filter and a mono adaptive filter per bin. The correlation may be checked per bin and the stereo adaptive filters and mono adaptive filters may be updated per bin. Additionally, signal selection may occur per bin. While separate stereo adaptive filters, mono adaptive filters, correlations, and signal selections per bin are described, in one embodiment, an item (e.g., filter, correlation unit, signal selection unit) may operate on two or more bins.

FIG. 1 illustrates a system for performing AEC using correlation based filter adaptation control. FIG. 1 illustrates a microphone 110 providing a signal to a stereo adaptive filter 130 and to a mono adaptive filter 140. FIG. 1 also illustrates a first speaker channel 122 and a second speaker channel 124 providing signals to a correlation detector 150. The correlation detector 150 determines a level of correlation between the signals from the first speaker channel 122 and the second speaker channel 124 and provides information concerning that level of correlation to an adaptive filter controller 160. The adaptive filter controller 160 selectively controls the adaptation of a stereo adaptive filter 130 and/or the mono adaptive filter 140. In different embodiments, the adaptive filter controller 160 may instruct a filter to continue adapting the way it is adapting, to change how it is adapting, or even to stop adapting. The stereo adaptive filter 130 and the mono adaptive filter 140 provide their filtered signals to a signal selector 170. The signal selector 170 chooses one signal to provide as an output signal 180. In one embodiment, the signal selector 170 may provide the received signal having the lowest power. Signal selection may be based on other attributes. The output signal 180 will have improved audio echo properties. For example, the output signal 180 may be echo free or may have reduced echo compared to the input signals.

FIG. 1 illustrates a system for performing stereo AEC using correlation based filter adaptation control. The stereo AEC performed in FIG. 1 refers to stereo speaker signals at the near end (e.g., the endpoint receiving stereo audio) of a communication. Thus, in FIG. 1, it is assumed that microphone 110 is a mono microphone. However, example systems, methods, and apparatus are not so limited. In one embodiment, where microphone 110 at the near end is stereo and is therefore sending stereo audio, additional independent adaptive filters may be employed. Additionally, while FIG. 1 illustrates a single stereo adaptive filter 130 and a single mono adaptive filter 140, when filter-bank analysis is used to break audio signals into bins based on frequency ranges, multiple filters, multiple correlation detectors, multiple filter controllers, and multiple signal selectors may be employed. The microphone capture can be mono, stereo, or multi-channel.

Figure 2:
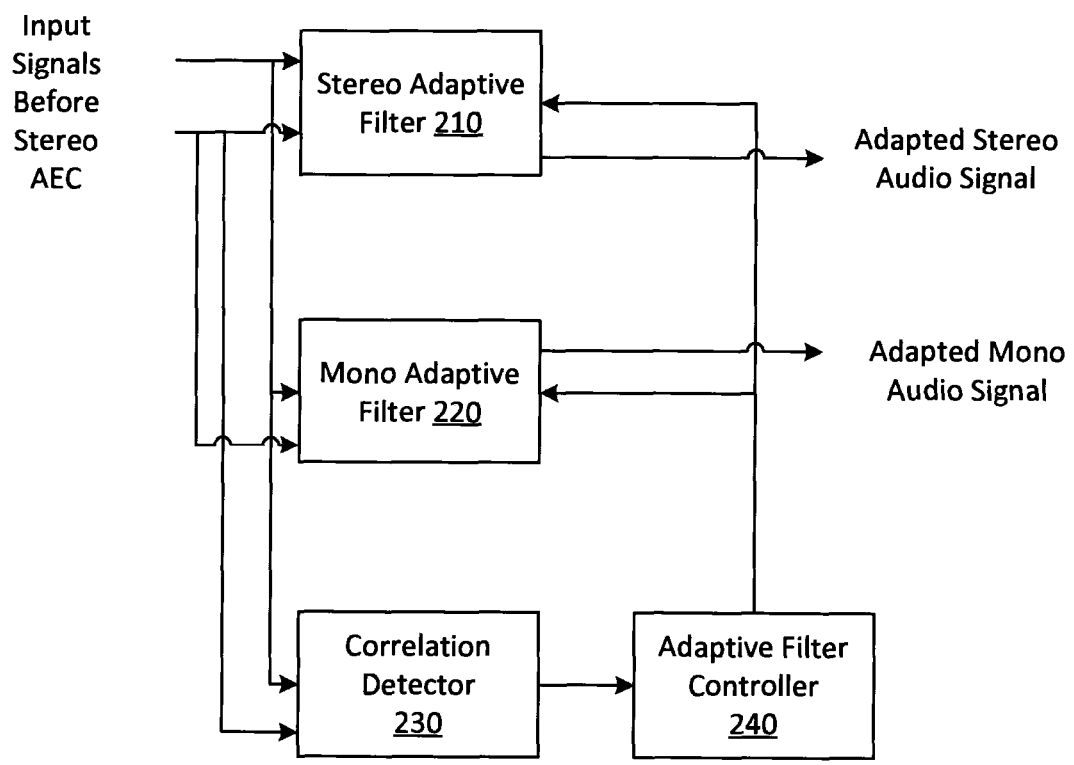
FIG. 2 illustrates an example system for performing stereo AEC using correlation based filter adaptation control.

FIG. 2 illustrates a system for performing stereo AEC. The system relies on correlation based adaptation of filters participating in the stereo AEC. A stereo adaptive filter 210 is configured to receive input signals. These signals have not yet had stereo AEC applied to them. The input signals can include both microphone input and speaker input signals. The stereo adaptive filter 210 is configured to produce an echo removed microphone signal based on the input audio signals. The stereo adaptive filter 210 is configured to mitigate audio echo in the microphone signal and thus the microphone signal output by the stereo adaptive filter 210 should have improved audio echo characteristics.

In the system, a mono adaptive filter 220 is also configured to receive the input audio signals and to produce an echo removed microphone signal based on the input audio signals. The mono adaptive filter 220 is configured to mitigate audio echo in the microphone signal and thus the microphone signal output by the mono adaptive filter 220 should have improved audio echo characteristics. In one embodiment, a mixer may be placed before the filter 220.

The system includes a correlation detector 230 that is configured to receive the speaker signals and to determine a level of correlation between the two channel speaker signals. The system also includes an adaptive filter controller 240 that is configured to control how the stereo adaptive filter 210 or the mono adaptive filter 220 adapts. The adaptive filter controller 240 is configured to selectively alter how the stereo adaptive filter 210 adapts audio echo cancellation filtering based, at least in part, on the level of correlation between the two channel speaker signals. Similarly, the adaptive filter controller 240 is configured to selectively alter how the mono adaptive filter 220 adapts audio echo cancellation filtering based, at least in part, on the level of correlation between the two channel speaker signals.

In one embodiment, the adaptive stereo filter 210 may be a recursive least squares filter. Other types of filters may be employed. In one embodiment, the adaptive mono filter 220 may be a normalized least mean squares filter. Other types of filters may be employed.

In different embodiments, the adaptive filter controller 240 may cause the stereo adaptive filter 210 or the mono adaptive filter 220 to adapt in different ways. In one embodiment, the adaptive filter controller 240 may be configured to selectively stop the stereo adaptive filter 210 from adapting upon determining that the level of normalized cross correlation between the two channel speaker signals is above a first correlation threshold. The first correlation threshold may be, for example, 0.98. Other thresholds may be employed. In one embodiment, the adaptive filter controller 240 may be configured to selectively stop the mono adaptive filter 220 from adapting upon determining that the level of correlation between the two channel speaker signals is below a second correlation threshold. The second correlation threshold may be, for example, 0.9. Other thresholds may be employed.

In one embodiment, rather than produce a binary adapt/do-not-adapt signal, the adaptive filter controller 240 may be configured to selectively adapt the rate at which the stereo adaptive filter 210 adapts as a function of the level of correlation between the two channel speaker signals. Similarly, the adaptive filter controller 240 may be configured to selectively adapt the rate at which the mono adaptive filter 220 adapts as a function of the level of correlation between the two channel speaker signals.

In one embodiment, the adaptive filter controller 240 may itself be configurable. For example, the adaptive filter controller 240 may be configured to receive a rate change signal and to adjust, based on the rate change signal, the rate at which the adaptive filter controller 240 adapts the stereo adaptive filter 210 or the mono adaptive filter 220.

In one embodiment, the stereo adaptive filter 210 and the mono adaptive filter 220 are configured to operate in parallel. In one embodiment, the adaptive filter controller 240 operates at the beginning of a conferencing session. However, during a conferencing session, a speaker might be repositioned, a microphone might be repositioned, or other changes may occur that affect the degree of correlation between signals. Thus, in one embodiment, the system may include a correlation change logic that is configured to identify that the level of correlation between the two channel speaker signals has changed by more than a threshold amount. Upon determining that the level of correlation has changed, the correlation change logic may control the correlation detector 230 to re-determine the level of correlation between the two channel speaker signals and then control the adaptive filter controller 240 to selectively re-control the stereo adaptive filter 210 or the mono adaptive filter 220. In one embodiment, the correlation detector 230 and the adaptive filter controller 240 operate throughout a conferencing session and thus the correlation change logic may not be employed.

Figure 3:
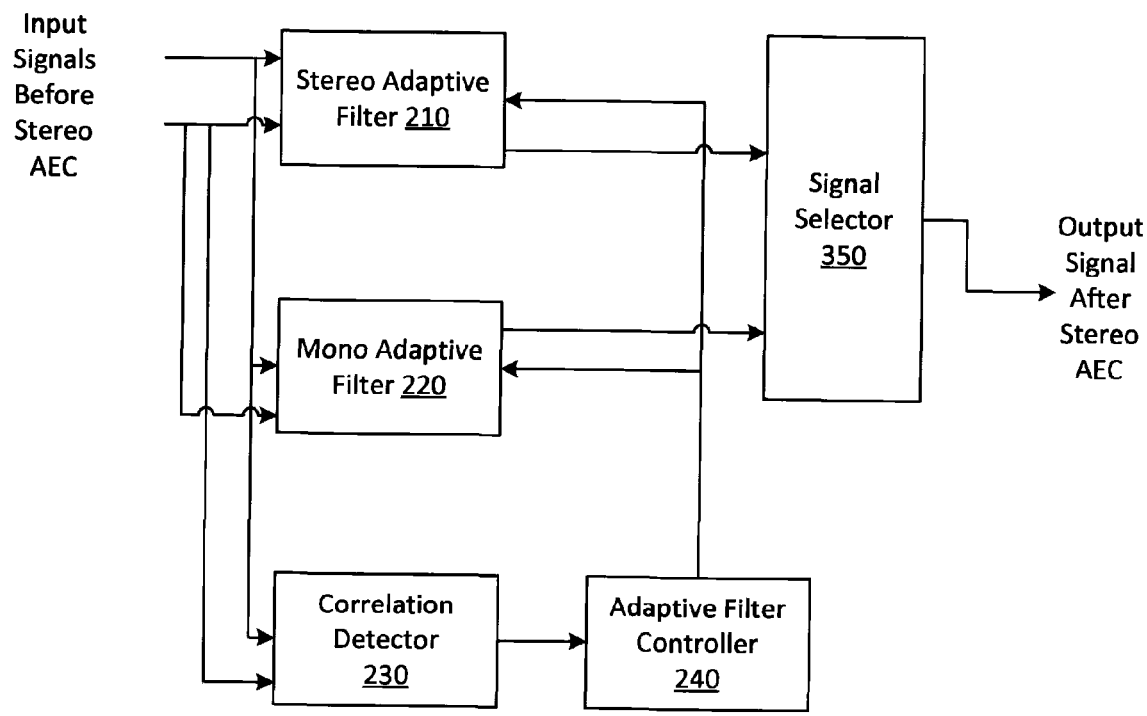
FIG. 3 illustrates an example system for performing stereo AEC using correlation based filter adaptation control.

FIG. 3 illustrates a system for performing stereo AEC. The system relies on correlation based adaptation of filters participating in the stereo AEC. This system includes the stereo adaptive filter 210, the mono adaptive filter 220, the correlation detector 230, and the adaptive filter controller 240 of the system illustrated in FIG. 2. However this system also includes a signal selector 350. In one embodiment, a mixer may be placed before the mono adaptive filter 220.

In one embodiment, signal selector 350 is configured to input the echo removed microphone signal from the stereo adaptive filter 210 and to determine a first value for an attribute of the signal. Similarly, signal selector 350 is configured to input the echo removed microphone signal from the mono adaptive filter 220 and to determine a second value for an attribute of the signal. The signal selector 350 may be configured to output either the echo removed microphone signal received from the stereo adaptive filter 210 or the echo removed microphone signal received from the mono adaptive filter 220 based, at least in part, on a comparison of the first value and the second value. The first value may be, for example, the power of the echo removed microphone signal received from the stereo adaptive filter 210 and the second value may be, for example, the power of the echo removed microphone signal received from the mono adaptive filter 220. In one embodiment, the signal selector 350 is configured to output the signal having the lower power. In one embodiment, the signal selector 350 is configured to output a mixture of the echo removed microphone signals.

The systems illustrated in FIGS. 2 and 3 may be employed in conferencing systems. Thus, in different embodiments, the speaker signals may be received from a conference call system or a video conference system. Thus, the signal selector 350 may be configured to provide the echo removed microphone signal to either a conference call system or video conference system.

The sounds carried by the input audio signals may have a wide frequency range. Conferencing systems and other communication systems may separate signals in the wide frequency range into smaller sub-bands. Thus, in one example, a system may include a filter bank analysis circuit that is configured to break the input audio signals into multiple frequency ranges. In this example, the system illustrated in FIG. 3 would include one or more additional stereo adaptive filters, one or more additional mono adaptive filters, one or more additional correlation detectors, and one or more additional adaptive filter controllers that may be employed on a per sub-band basis. In one example, the correlation detector will operate on the full-band before the filter bank analysis occurs. In this example, the correlation results may apply to all frequency bins. In another example, individual correlation detectors may be configured to determine a level of correlation for signals in individual frequency ranges. Similarly, individual adaptive filter controllers may be configured to selectively alter how individual stereo adaptive filters and mono adaptive filters adapt per frequency sub-band.

Figure 4:
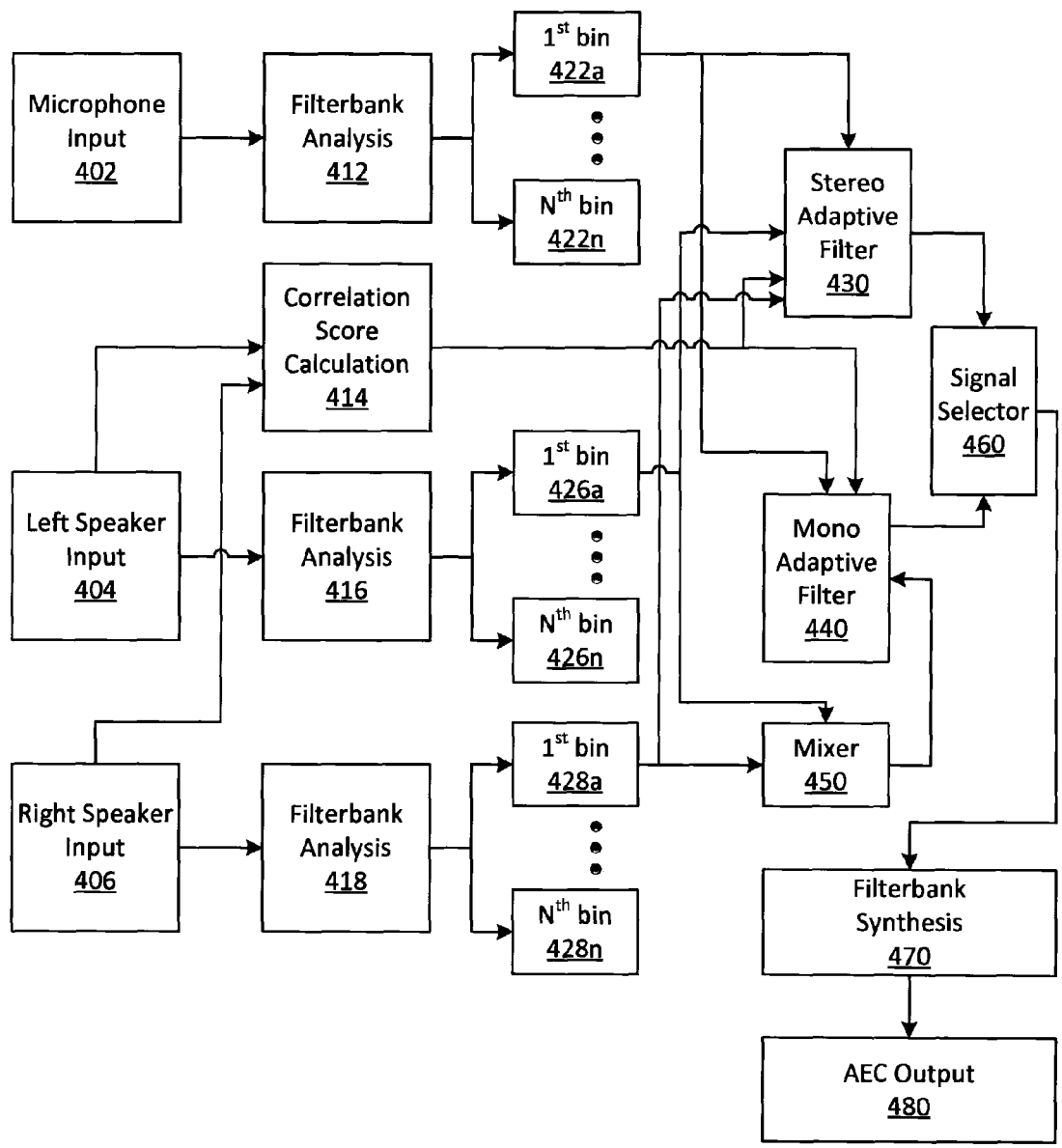
FIG. 4 illustrates an example system for performing stereo AEC using correlation based filter adaptation control.

FIG. 4 illustrates an example system configured to perform correlation based filter adaptation control to support stereo AEC. A microphone input 402 is provided to a filter bank analysis circuit 412 that separates the input into bins 422a through 422n. The bins may be, for example, 50 Hz wide. The filter bank analysis circuit 412 may perform linear binning. Similarly, a left speaker input 404 is provided to filter bank analysis circuit 416 that separates the input into bins 426a through 426n and a right speaker input 406 is provided to filter bank analysis circuit 418 that separates the input into bins 428a through 428n. The filter bank analysis circuits may be, for example, sets of band pass filters. FIG. 4 illustrates blocks 430, 440, 450, and 460 processing signals from the first sets of bins (e.g., 422a, . . . 428a). One skilled in the art will appreciate that additional circuits, logics, or other elements will perform similar processing for the other sets of bins (e.g., 422n . . . 428n). Thus, while filter bank synthesis block 470 is illustrated receiving an input from signal selector 460, filter bank synthesis block 470 may actually receive inputs from multiple signal selectors associated with the other bins.

The left speaker input 404 and the right speaker input 406 are also provided to a correlation score calculation circuit 414. The correlation score calculation circuit 414 determines the degree of correlation between the left speaker input 404 and the right speaker input 406. The correlation score circuit 414 then provides an adaptation control signal to a stereo adaptive filter 430 and to a mono adaptive filter 440.

The stereo adaptive filter 430 receives inputs from the first bin 422a associated with the microphone 402, from the first bin 426a associated with the left speaker input 404, and from the first bin 428a associated with the right speaker input 406.

The stereo adaptive filter processes (e.g., filters) the received signals and provides an output to signal selector 460. Similarly, the mono adaptive filter 440 receives and processes inputs from the first bin 422a associated with the microphone 402, from the first bin 426a associated with the left speaker input 404, and from the first bin 428a associated with the right speaker input 406. The speaker inputs may first pass through mixer 450. The mono adaptive filter 440 also provides a signal to the signal selector 460. The signal selector 460 may pick one of the two signals to provide to filter bank synthesis circuit 470, which synthesizes signals from a number of bins and produces the AEC output 480. Thus, different paths than those illustrated in FIG. 4 may be possible.

In FIG. 4, blocks 430, 440, 450 and 460 are connected to just the first bin. One skilled in the art will appreciate that additional stereo adaptive filters 430, additional mono adaptive filters 440, additional mixers 450, and additional signal selectors 460 may be running independently for the other bins.

While a single stereo adaptive filter 430 is illustrated, there may be a stereo adaptive filter for each of the bins. Similarly, while a single mono adaptive filter 440 is illustrated, there may be a mono adaptive filter for each of the bins. Additionally, while a single signal selector 460 is illustrated, there may be a signal selector for each of the bins. Likewise, while a single correlation score calculation circuit 414 is illustrated, there may be a correlation score calculator for each of the bins. In different embodiments, a filter, selector, or calculator may operate on signals in a single bin or on signals in two or more bins.

FIG. 4 illustrates a system for mono capture. A system for stereo capture or for multiple channel capture would include additional (e.g., duplicate) circuits for both microphone channels.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 5:
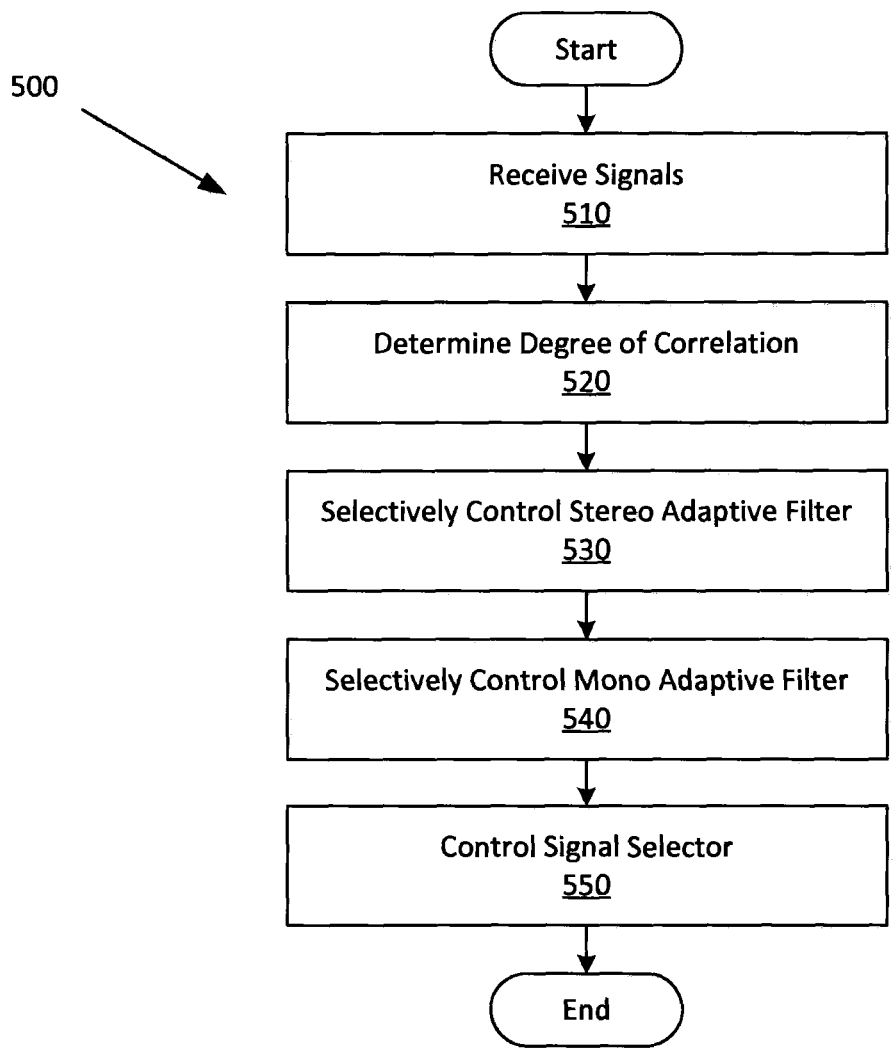
FIG. 5 illustrates an example method for performing stereo AEC using a correlation based filter adaptation control approach.

FIG. 5 illustrates an example method 500 associated with correlation based filter adaptation control for filters participating in stereo AEC. Method 500 is performed by an apparatus (e.g., computer, telephone system). Method 500 includes, at 510, receiving a microphone signal, a left speaker channel signal, and a right speaker channel signal associated with one end of a conferencing session. More generally, the method may receive a set of input signals that include various microphone captures. The microphone signal, the left speaker channel signal, and the right speaker channel signal may produce a first level of audio echo in the conferencing session. The method 500 seeks to mitigate audio echo by controlling components that perform stereo AEC. While a left speaker channel signal, a right speaker channel signal, and a microphone signal are described, other signals and other combinations of signals may be received and processed.

Method 500 also includes, at 520, determining a degree of correlation between the left speaker channel signal and the right speaker channel signal of the speaker. The degree of correlation is used to determine whether and how to cause adaptive filters to change how they are affecting stereo AEC processing. While left speaker channel signal and right speaker channel signal are described, more generally, a first speaker signal and a second speaker signal may be processed.

In one embodiment, method 500 also includes, at 530, selectively controlling a stereo adaptive filter participating in stereo acoustic echo cancellation for the conferencing session to stop adapting when the degree of correlation is above a first threshold. Recall that stereo adaptive filtering may become unstable when input signals are too highly correlated. In this embodiment, the stereo adaptive filter is controlled to either adapt according to a pre-configured approach or to stop adapting. In another embodiment, the stereo adaptive filter may instead be controlled to adapt at different rates based on the degree of correlation. For example, the stereo adaptive filter may be controlled to adapt at a first higher rate when the degree of correlation is below a threshold but to adapt at a second lower rate when the degree of correlation is above a threshold. In another embodiment, the stereo adaptive filter may be controlled to adapt at a rate that is a function of the degree of correlation. The function may be linear, exponential, may be a step function, or may have other forms.

Method 500 also includes, at 540, selectively controlling a mono adaptive filter participating in stereo acoustic echo cancellation for the conferencing session to stop adapting when the degree of correlation is below a second threshold. Recall that mono adaptive filtering may become unstable when input signals are too loosely correlated. In this embodiment, the mono adaptive filter is controlled to either adapt according to a pre-configured approach or to stop adapting. In another embodiment, the mono adaptive filter may instead be controlled to adapt at different rates based on the degree of correlation. For example, the mono adaptive filter may be controlled to adapt at a first higher rate when the degree of correlation is above a threshold but to adapt at a second lower rate when the degree of correlation is below a threshold. In another embodiment, the mono adaptive filter may be controlled to adapt at a rate that is a function of the degree of correlation. The function may be linear, exponential, may be a step function, or may have other forms.

Method 500 also includes, at 550, controlling a signal selector to provide, as an output signal, a signal that is determined to be the superior signal in terms of echo removal. The signal selector may be controlled to provide either a signal produced by the stereo adaptive filter or a signal produced by the mono adaptive filter. In one embodiment, the output signal is selected based on the power of the signal from the stereo adaptive filter and the power of the signal from the mono adaptive filter. For example, the signal with the lower power may be output. Method 500 facilitates producing an output signal having a second, lower level of audio echo in the conferencing session. In one embodiment, method 500 may include, at 550, controlling the signal selector to provide a mixed output signal. The mixed output signal may be mixed from the signal produced by the stereo adaptive filter and the signal produced by the mono adaptive filter. In one embodiment, the mixing may be controlled by the power of the signals.

While FIG. 5 illustrates various actions occurring in serial, it is to be appreciated that various actions illustrated in FIG. 5 could occur substantially in parallel. By way of illustration, a first process could receive signals, a second process could determine the degree of correlation, a third process could selectively control filters, and a fourth process could control a signal selector. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including method 500. While executable instructions associated with the above method are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 6:
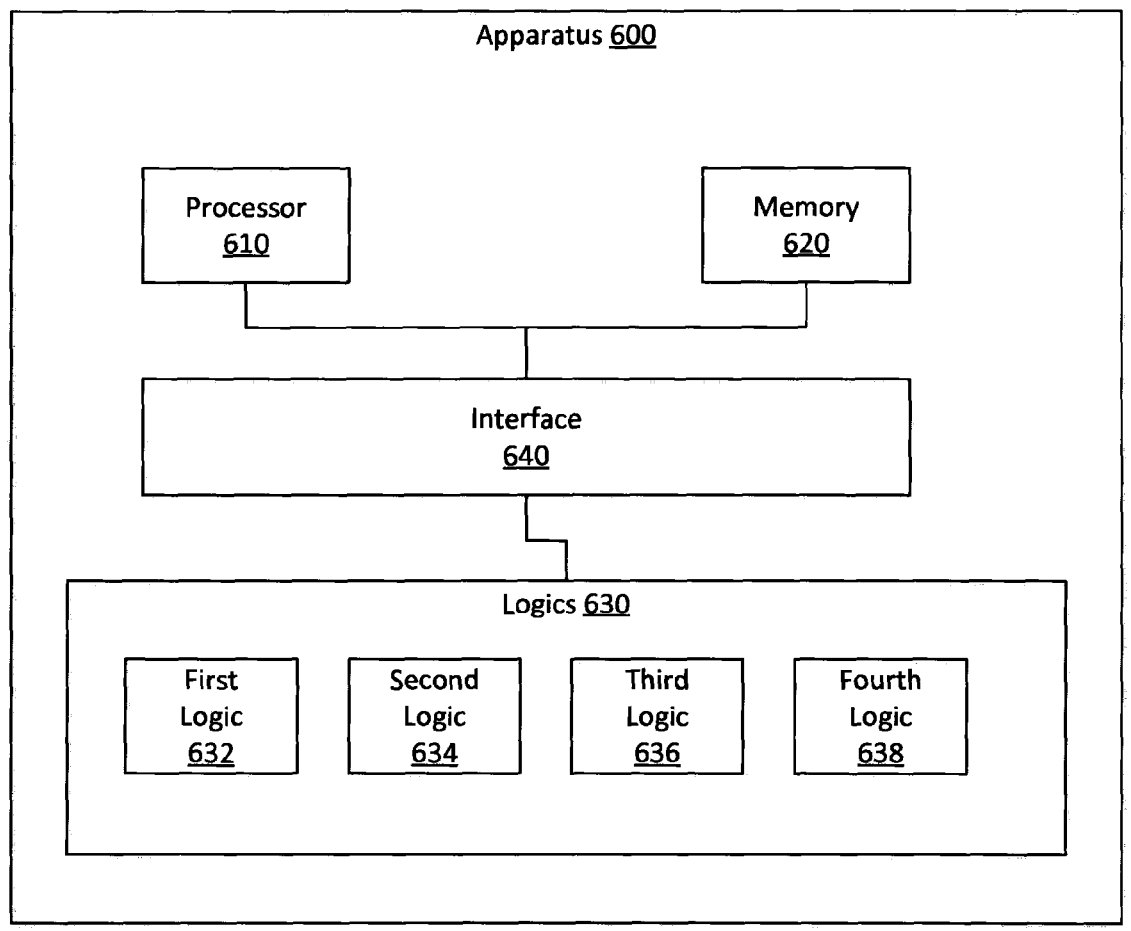
FIG. 6 illustrates an example apparatus configured to perform correlation based filter adaptation control.

FIG. 6 illustrates an apparatus 600 that includes a processor 610, a memory 620, a set 630 of logics, and an interface 640 that connects the processor 610, the memory 620, and the set 630 of logics. The set 630 of logics may be configured to perform correlation based filter adaptation control associated with stereo AEC. Apparatus 600 may be, for example, a computer, a laptop computer, a tablet computer, a personal electronic device, a smart phone, a conference phone, or other device that can access and process data and audio signals.

In one embodiment, the apparatus 600 may be a general purpose computer that has been transformed into a special purpose computer through the inclusion of the set 630 of logics. The set 630 of logics may be configured to control stereo acoustic echo cancellation for a system by controlling a stereo adaptive filter, a mono adaptive filter, and a signal selector. Apparatus 600 may interact with other apparatus, processes, and services through, for example, a computer network.

The set 630 of logics may include a first logic 632 that is configured to receive a first speaker signal, a second speaker signal, and a microphone signal. The first speaker signal, the second speaker signal, and the microphone signal may produce a first level of audio echo in, for example, a conferencing system. The signals may be processed by, for example, a stereo adaptive filter that processes the first speaker signal and the second speaker signal into an output stereo signal. The signals may also be processed by, for example, a mono adaptive filter that processes the first speaker signal and the second speaker signal into an output mono signal. The filters participate in performing stereo AEC for the signals.

The set 630 of logics may also include a second logic 634 that is configured to produce an adaptation control signal based on the degree to which the first speaker signal and the second speaker signal are correlated. For example, if the signals are highly correlated then the second logic 634 may produce a signal to control a stereo adaptive filter to change its operation while if the signals are loosely correlated then the second logic 634 may produce a signal to control a mono adaptive filter to change its operation. In one embodiment, the second logic 634 may produce signals to control both the stereo adaptive filter and the mono adaptive filter. The control signals may be a function of the degree to which the signals are correlated.

The set 630 of logics may also include a third logic 636 that is configured to control the rate at which the stereo adaptive filter and the mono adaptive filter adapt. The third logic 636 may control the rate as a function of the adaptation control signal. In one embodiment, the third logic 636 may be configured to control the stereo adaptive filter to stop adapting upon determining that the degree to which the first speaker signal and the second speaker signal are correlated exceeds a high end correlation threshold. In one embodiment, the third logic 636 may be configured to control the mono adaptive filter to stop adapting upon determining that the degree to which the first speaker signal and the second speaker signal are correlated is below a low end correlation threshold.

The set 630 of logics may also include a fourth logic 638 that is configured to selectively provide as an output signal either the signal output by the stereo adaptive filter or the signal output by the mono adaptive filter based on a comparison of an attribute of the two signals. In one embodiment, the attribute is the power level of the signals. Apparatus 600 facilitates providing an output signal having a second, lower level of audio echo than was present in the input signals.

In one embodiment, apparatus 600 may be configured to continuously analyze, filter, and adapt. Thus, in one embodiment, the first logic 632 may be configured to continuously receive the first speaker signal, the second speaker signal, and the microphone signal. The second logic 634 may be configured to continuously produce the adaptation control signal and the third logic 636 may be configured to continuously control the rate at which the stereo adaptive filter and the mono adaptive filter adapt.

In different embodiments, some processing may be performed on the apparatus 600 and some processing may be performed by an external service or apparatus. Thus, in one embodiment, apparatus 600 may also include a communication circuit that is configured to communicate with an external source to facilitate receiving or transmitting items including, but not limited to, audio signals, and control signals.

Figure 7:
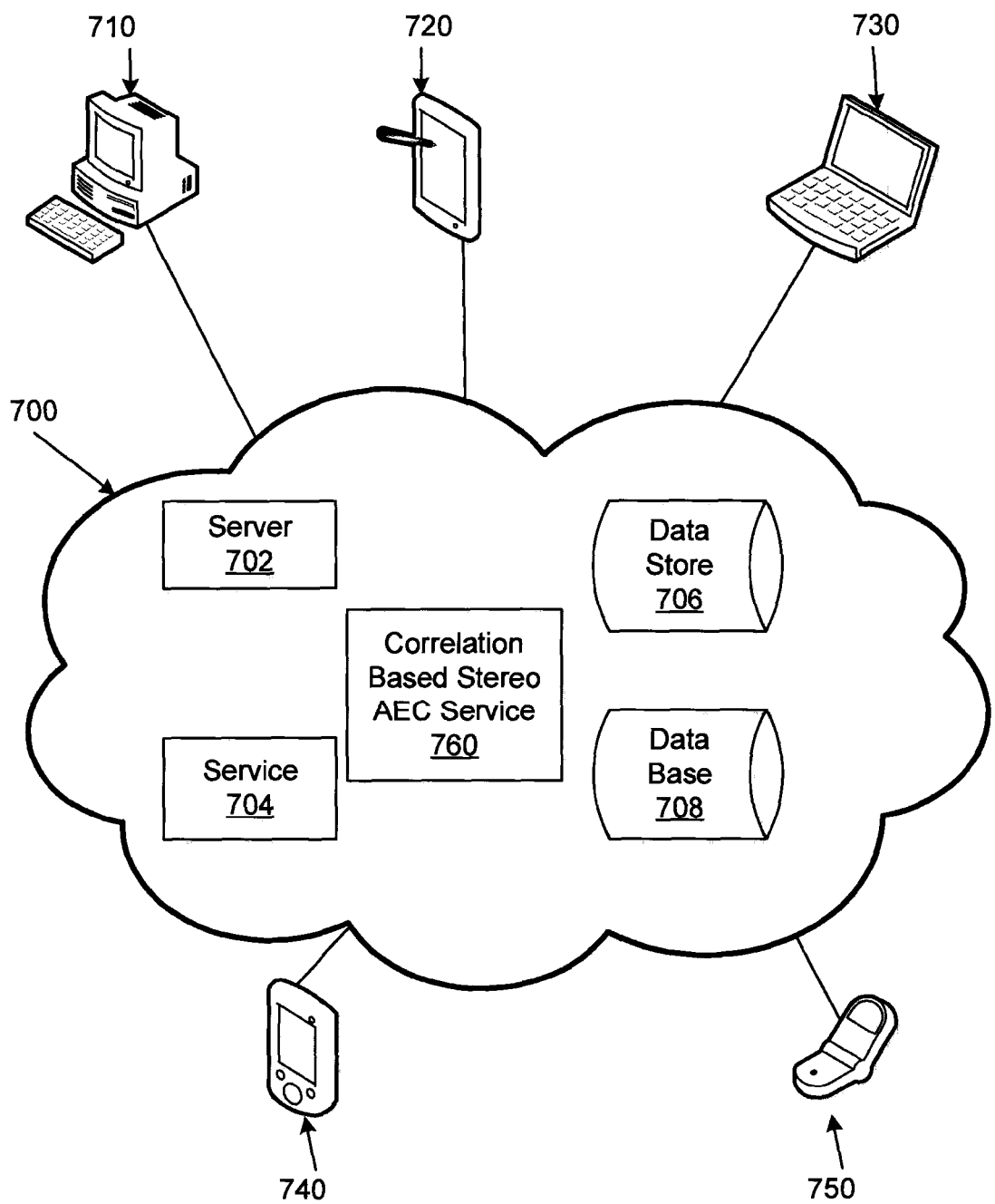
FIG. 7 illustrates an example cloud operating environment performing stereo AEC using a correlation based filter adaptation control approach.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example correlation based stereo AEC service 760 residing in the cloud. The correlation based stereo AEC service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the correlation based stereo AEC service 760.

FIG. 7 illustrates various devices accessing the correlation based stereo AEC service 760 in the cloud. The devices include a computer 710, a tablet 720, a laptop computer 730, a personal digital assistant 740, and a mobile device (e.g., cellular phone, satellite phone) 750. The correlation based stereo AEC service 760 may receive signals having a first level of audio echo and produce signals having a second, better level of audio echo.

It is possible that different users at different locations using different devices may access the correlation based stereo AEC service 760 through different networks or interfaces. In one example, the correlation based stereo AEC service 760 may be accessed by a mobile device 750. In another example, portions of correlation based stereo AEC service 760 may reside on a mobile device 750.

Figure 8:
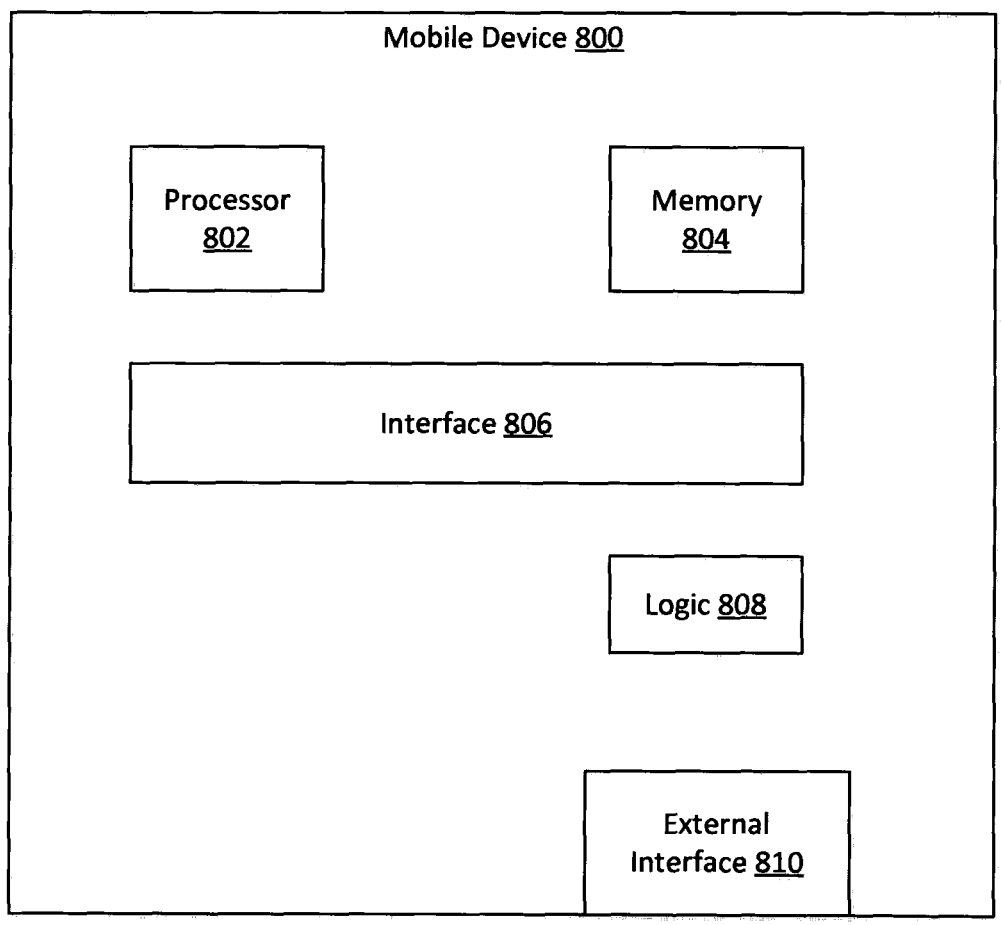
FIG. 8 illustrates an example mobile computing device configured to perform correlation based filter adaptation control.

FIG. 8 illustrates an example mobile device 800. Mobile device 800 may be carried by a user who wishes to engage a correlation based filter adaptation for stereo AEC. Multiple users may participate in conference calls while in a variety of locations. The users may conference in using their mobile devices. Mobile device 800 includes a processor 802, a memory 804, a logic 808, and an external interface 810 that may be connected by an interface 806. Mobile device 800 may be, for example, a cellular telephone, a network telephone, or other device. Generally describing an example configuration of the mobile device 800, the processor 802 may be a variety of various processors including dual microprocessor and other multi-processor architectures. The memory 804 may include volatile memory or non-volatile memory. Non-volatile memory may include, for example, read only memory (ROM), programmable ROM (PROM), and other memory. Volatile memory may include, for example, random access memory (RAM), dynamic RAM (DRAM), and other memory. The memory 804 can store an operating system that controls and allocates resources of the mobile device 800. The memory 804 may also store a correlation based stereo AEC filter adaptation process that may be used to adapt one or more circuits, devices, processes, or other participants in an audible communication.

The interface 806 may be a single internal bus interconnect architecture or other bus or mesh architectures. While a single bus is illustrated, it is to be appreciated that the mobile device 800 may communicate with various devices, logics, and peripherals using other busses (e.g., PCIE, 1394, USB, Ethernet). The interface 806 can be types including, for example, a memory bus, a memory controller, a peripheral bus, an external bus, a crossbar switch, or a local bus.

The mobile device 800 can operate in a network environment and thus may be connected to a network through network devices via the external interfaces 810. The mobile device 800 may be logically connected to remote computers or other mobile devices through the network and the network devices. Through the network, the mobile device 800 may also be connected to services (e.g., service 760, FIG. 7) provided in the cloud (e.g., cloud 700, FIG. 7). Networks with which the mobile device 800 may interact include, but are not limited to, a conferencing network, a local area network (LAN), a wide area network (WAN), a telephony network, a telephony system, a cellular system, a satellite system, and other networks.

Mobile device 800 may include a special purpose logic 808 that is configured to provide a functionality for the mobile device 800. For example, logic 808 may provide a client for interacting with a service (e.g., service 760, FIG. 7), or for performing correlation based filter adaptation for stereo AEC.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for performing stereo audio echo cancellation (AEC), comprising:
   a stereo adaptive filter that receives a microphone signal and two channel speaker signals, where the two channel speaker signals have not yet had stereo AEC applied to them, the two channel speaker signals being received, respectively, from two separate speakers and where the stereo adaptive filter produces an echo removed microphone signal based on the microphone signal and the two channel speaker signals, where the stereo adaptive filter mitigates audio echo associated with the two channel speaker signals;
   a mono adaptive filter that receives the microphone signal and the two channel speaker signals and produces a second echo removed microphone signal based on a mixture of the two channel speaker signals, where the mono adaptive filter mitigates audio echo associated with the two channel speaker signals;
   a correlation detector that receives the two channel speaker signals and determines a level of correlation between the two channel speaker signals;
   an adaptive filter controller that selectively alters how the stereo adaptive filter adapts audio echo cancellation filtering based, at least in part, on the level of correlation between the two channel speaker signals, and that selectively alters how the mono adaptive filter adapts audio echo cancellation filtering based, at least in part, on the level of correlation between the two channel speaker signals, where the adaptive filter controller selectively adapts the rate at which the stereo adaptive filter adapts as a function of the level of correlation between the two channel speaker signals, and selectively adapts the rate at which the mono adaptive filter adapts as a function of the level of correlation between the two channel speaker signals; and
   a signal selector that inputs the echo removed microphone signal and determines a first value for an attribute of the echo removed microphone signal, inputs the second echo removed microphone signal and determines a second value for an attribute of the second echo removed microphone signal, and outputs the echo removed microphone signal or the second echo removed microphone signal based, at least in part, on a comparison of the first value and the second value, the first value being the power of the echo removed microphone signal, the second value being the power of the second echo removed microphone signal, and where the signal selector outputs the signal having the lower power.

2. The system of claim 1, where the adaptive filter controller selectively stops the stereo adaptive filter from adapting upon determining that the level of correlation between the two channel speaker signals is above a first correlation threshold and selectively stops the mono adaptive filter from adapting upon determining that the level of correlation between the two channel speaker signals is below a second correlation threshold.

3. The system of claim 1, where the stereo adaptive filter receives and processes multi-channel speaker signals, the mono adaptive filter receives and processes the multi-channel speaker signals, and the correlation detector receives the multi-channel speaker signals and determines a level of correlation between the multi-channel speaker signals.

4. The system of claim 1, where the adaptive filter controller receives a rate change signal and adjusts, based on the rate change signal, the rate at which the adaptive filter controller adapts the stereo adaptive filter or the mono adaptive filter.

5. The system of claim 1, where the signal selector selectively mixes the echo removed microphone signal and the second echo removed microphone signal at a mixture rate, where the mixture rate is based on the power of the echo removed microphone signal and the power of the second echo removed microphone signal.

6. The system of claim 1, the two channel speaker signals being received from a conference call system or a video conference system, and where the signal selector provides the echo removed microphone signal or the second echo removed microphone signal or a mix of the echo removed microphone signal and the second echo removed microphone signal to the conference call system or to the video conference system.

7. The system of claim 1, where the stereo adaptive filter and the mono adaptive filter operate in parallel.

8. The system of claim 1, comprising:
   a filter bank circuit that separates the microphone signal and the two speaker signals into two or more frequency ranges;
   one or more additional stereo adaptive filters;
   one or more additional mono adaptive filters;
   zero or more additional correlation detectors; and
   one or more additional adaptive filter controllers, where the correlation detectors determine a level of correlation for signals in the two or more frequency ranges, where the adaptive filter controllers selectively alter how the stereo adaptive filters adapt based, at least in part, on the level of correlation for signals in the two or more frequency ranges, and where the adaptive filter controllers selectively alter how the mono adaptive filters adapt based, at least in part, on the level of correlation for signals in the two or more frequency ranges.

9. The system of claim 1, comprising a correlation change logic that identifies that the level of correlation between the two channel speaker signals has changed by more than a threshold amount, that controls the correlation detector to re-determine the level of correlation between the two channel speaker signals, that controls the adaptive filter controller to selectively alter how the stereo adaptive filter adapts based, at least in part, on the re-determined level of correlation, and that selectively alters how the mono adaptive filter adapts based, at least in part, on the re-determined level of correlation.

10. A method, comprising:
receiving a microphone signal, a left speaker channel signal, and a right speaker channel signal associated with one end of a conferencing session, where the microphone signal, the left channel signal, and the right channel signal produce a first level of audio echo in the conferencing session;
determining a degree of correlation between the left channel signal and the right channel signal;
selectively controlling a stereo adaptive filter participating in stereo acoustic echo cancellation for the conferencing session to stop adapting when the degree of correlation is above a first threshold;
selectively controlling a mono adaptive filter participating in stereo acoustic echo cancellation for the conferencing session to stop adapting when the degree of correlation is below a second threshold;
selectively controlling the stereo adaptive filter to adapt at a first rate when the degree of correlation is below the first threshold, where first rate is a function of the degree of correlation;
selectively control the mono adaptive filter to adapt at a second rate when the degree of correlation is above the second threshold, where the second rate is a function of the degree of correlation; and
controlling a signal selector to provide, as an output signal, a signal produced by the stereo adaptive filter, a signal produced by the mono adaptive filter, or a mix of the signal produced by the stereo adaptive filter and the signal produced by the mono adaptive filter, where the output signal is selected based on the power of the signal produced by the stereo adaptive filter and the power of the signal produced by the mono adaptive filter, where the signal selector produces the mix by selectively mixing the signal produced by the stereo adaptive filter and the signal produced by the mono adaptive filter at a dynamic mixture rate, the dynamic mixture rate being based on a comparison of the power of the signal produced by the stereo adaptive filter and the power of the signal produced by the mono adaptive filter, and where the output signal produces a second, lower level of audio echo in the conferencing session.

11. An apparatus, comprising:
a processor;
a memory;
a set of logics that controls stereo acoustic echo cancellation for a system by controlling a stereo adaptive filter, a mono adaptive filter, and a signal selector associated with the system; and an interface to connect the processor, the memory, and the set of logics;
the set of logics comprising:
a first logic that receives a first speaker signal, a second speaker signal, and a microphone signal, where the first speaker signal, the second speaker signal, and the microphone signal produce a first level of audio echo;
a second logic that produces an adaptation control signal based on the degree to which the first speaker signal and the second speaker signal are correlated; and
a third logic that controls the rate at which the stereo adaptive filter and the mono adaptive filter adapt audio echo cancellation as a function of the adaptation control signal, where the stereo adaptive filter processes the first speaker signal and the second speaker signal into a first output signal and where the mono adaptive filter processes the first speaker signal and the second speaker signal into a second output signal.

12. The apparatus of claim 11, where the third logic controls the stereo adaptive filter to stop adapting upon determining that the degree to which the first speaker signal and the second speaker signal are correlated exceeds a high end correlation threshold.

13. The apparatus of claim 12, where the third logic controls the mono adaptive filter to stop adapting upon determining that the degree to which the first speaker signal and the second speaker signal are correlated is below a low end correlation threshold.

14. The apparatus of claim 11, where the first logic continuously receives the first speaker signal, the second speaker signal, and the microphone signal, where the second continuously produces the adaptation control signal, and where the third logic continuously controls the rate at which the stereo adaptive filter and the mono adaptive filter adapt.

15. The apparatus of claim 11, comprising a fourth logic that selectively provides as an output signal either the first output signal or the second output signal based on a comparison of an attribute of the first output signal and the second output signal, where a second, lower level of audio echo is present in the output signal, the attribute being a power level, where the fourth logic selectively provides the output signal having a lower power level.

16. The apparatus of claim 11, comprising a fourth logic that selectively provides as an output signal a mixture of the first output signal and the second output signal, where the fourth logic selectively mixes the first output signal and the second output signal at a mixture rate determined by a comparison of an attribute of the first output signal and an attribute of the second output signal, where the attribute is a power level.

* * * * *